United States Patent [19]
Steenbergen et al.

[11] Patent Number: 4,695,994
[45] Date of Patent: Sep. 22, 1987

[54] METHOD AND APPARATUS FOR VARYING LASER INTENSITY LEVEL

[75] Inventors: Christiaan Steenbergen, Colorado Springs, Colo.; Peter G. Howard, Eugene, Oreg.; Roger R. Bracht; Henk van der Put, both of Colorado Springs, Colo.

[73] Assignee: Laser Magnetic Storage International Company, Colorado Springs, Colo.

[21] Appl. No.: 720,218

[22] Filed: Apr. 5, 1985

[51] Int. Cl.⁴ .............................................. G11B 7/00
[52] U.S. Cl. ..................................... 369/54; 369/100; 369/121; 346/76 L
[58] Field of Search ................. 369/54, 100, 116, 121, 369/109, 106; 358/342; 346/76 L, 137, 108

[56] References Cited

U.S. PATENT DOCUMENTS 4,122,409 10/1978 Marlett et al. ...................... 346/108
4,509,156 4/1985 Ohara et al. ........................... 369/54
4,562,567 12/1985 Frankfort et al. ................. 369/54 X Primary Examiner—Robert L. Richardson
Attorney, Agent, or Firm—Sheridan, Ross & McIntosh

[57] ABSTRACT

This invention relates to the field of radiant energy information storage devices and provides for a low reading level, an intermediate level and a high writing level of power from the radiation source so as to lower the overall power requirements of the radiation source and increase availability and accuracy of the verification read directly after or during writing, without causing unwanted damage to the information recording media. A circuit is described to accomplish this. The circuit basically employs two power sources, one for reading power, one for writing power and an intermediate ("Pedestal") circuit to employ a portion of the writing power source's power to provide the step-up in power to the intermediate level.

19 Claims, 3 Drawing Figures

METHOD AND APPARATUS FOR VARYING LASER INTENSITY LEVEL

This invention relates to the field of laser power level control, and more particularly to where such control is employed in optical disk storage systems.

BACKGROUND OF THE INVENTION

Generally, in optical recording, the same beam which is used for reading information from tracks on optical media is also used for recording information on the same media. Where such is the case, two distinctly different power levels are used for reading and writing operations. Usually a very low power reading beam is employed to attenuate concerns over the potential problems involved with reading and re-reading an area in a short period of time, which, if the read beam is strong enough, could result in damage to the disk media surface and loss of recorded information. Depending on the type of media employed such damage could result from any number of potential causes including, unwanted ablation due to successive heating, or other types of changes in the physical structure of the recording substrate or even changes in the protective surface or carrier layers of the recording media. Therefore it is important, especially to applications which may require reading and re-reading of the same track areas, that the read power be very low. A higher power is used to "write" on the media, that is, to cause detectable modulations in its information bearing layer(s).

In the implementation of many optical disk storage systems to which this invention is primarily directed, a direct read during write operation is used to ensure that the data has been written correctly. That is, the data written is read immediately to verify it.

In an implementation employing media such as that employed in the preferred embodiment reflective surface is removed during writing causing ablation in the media surface and resulting in a nonreflective pit in the information bearing layer.

SUMMARY OF THE INVENTION

The writing power required to form equal sized holes turns out to be significantly less when the laser is already operating at a "pedestal" level substantially above that of the lowest reading power level. In other words, a step-up in power before stepping up to full writing power with the laser will require less overall power expenditure to form a hole, or write, on the media. That is, a lower "full" power is required to "write" than without using the pedestal level. Unfortunately, this substantial step-up in power before a write, if continued during reading, is likely to damage the disk media surface as mentioned. The inventors herein have designed a circuit to take advantage of the power savings and laser duty cycle savings (thus increasing useful life of the laser) inherent in using a step-up in power (the power pedestal) before stepping up to a full write power. Again, this full write power, when used with the media employed in the preferred embodiment, allows for lower pulsed power to accomplish the same ablation on the disk surface media than would otherwise be required.

Maintaining a power pedestal for a short period after the write pulse also has the effect of enhancing the readability of the just-written pit (it is called a "pit" with the media described herein but may be called a modulation in the more general case). The problem of reduced readability may be due to temporary loss of efficiency of the reading photodiode and associated electronics or the fact that the beam is not centered on the pit or modulation immediately after the write pulse or some combination of these or other factors, but whatever the cause, this invention helps to overcome it and enhances verification of what has been written.

This invention provides for pulsing a laser with smaller transient power changes than ordinarily required for writing on a data disk. In the implementation described, the injection of a small additional current to the read current on the order of 3 to 10 milliamps raises the read power of the laser by an additional 50% to a little over 1 milliwatt, this being a sufficient "pedestal" level to achieve the results described above in the media used with the preferred embodiment, but different values for the power levels may be required with different media.

A circuit illustrative of the preferred embodiment is also described. A further understanding of the features, qualities and advantages of the instant invention will be become readily apparent when the detailed description of the preferred embodiment is read in conjunction with the accompanying drawings taken as limited only by the appended claims.

DETAILED DESCRIPTION OF THE PREFERRED EMBODIMENT

The adoption of a read pedestal power before implementation of a write pulse in a laser beam, or the more general implementation of a slightly stepped up power before and after a full power use of the laser beam, may result in uses and advantages not currently understood. The preferred embodiment herein described is expected to be read as illustrative of this teaching only and not limited to the particular media and implementation described by the preferred embodiment.

Figure 1:
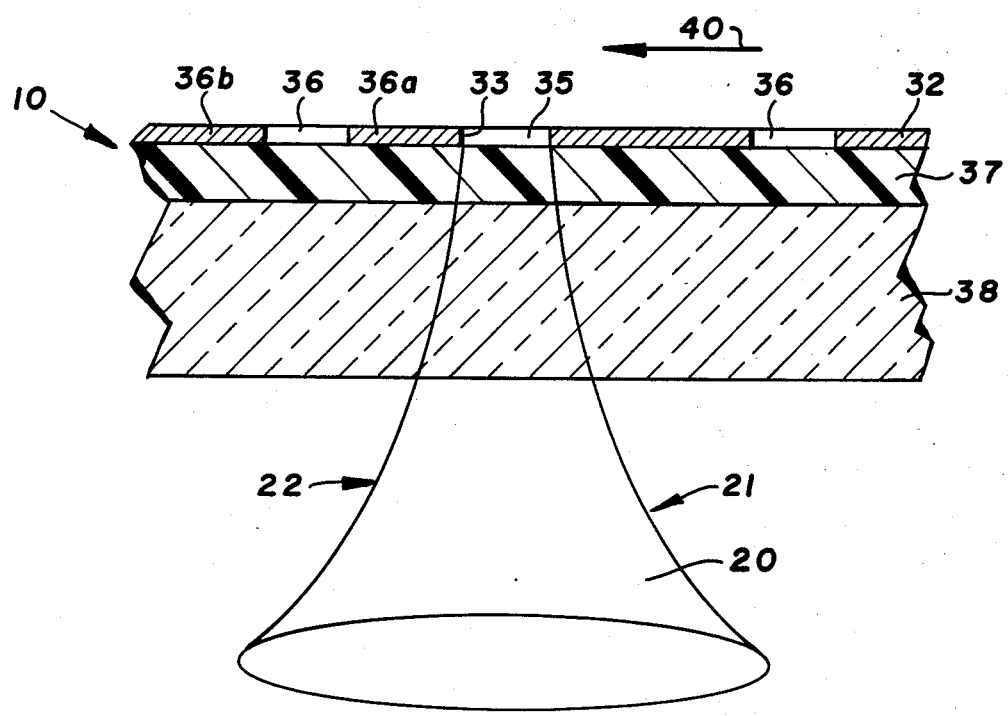
FIG. 1 is a cross-sectional view of a recording media structure for use with the preferred embodiment, illustrating the layered construction of the media, the impingement of a radiation beam upon same, and the formation of data holes in that media structure.

The media described by FIG. 1 is merely for illustration and it should be noted that intensity levels of laser pulses, their duration, size and so forth may vary considerably from those given herein without deviating from the invention.

Referring now to FIG. 1 in which the workpiece, or recording media, is generally referred to with the numeral 10, the laser beam at the pictured instant in time is referred to generally with the numeral 20 having a leading edge 21 and trailing edge 22. Arrow 40 indicates the direction of movement of the workpiece media 10. Where the media described herein is employed, this travel is at a rate of approximately 0.3 microns per 60 nanosecond time interval, said 60 nanosecond time interval being equivalent to the ordinary duration of a write pulse such as that required to produce hole 36 in a tellurium or rhodium surface such as layer 32, which is the information-bearing layer in the preferred embodiment. This time period must be larger without the "pedestal" power (or step-up in laser intensity) immediately preceeding the write. As is understood by those in the art, pulse duration, pulse intensity, media or laser movement speed, and media material modulability or deformability are proportionally related in obvious ways. For example, a stronger pulse requires less duration to write, other factors being equal.

The clear or translucent substrate layer 38 is usually a glass, the next clear layer 37 may be a photopolymer lacquer and the information bearing layer 32 is a tellurium or rhodium surface, bounded on the side opposite the substrate 38 by air or another substrate layer(not shown). Again, this structure and composition of this media is provided for illustrative purposes only; the invention may be modified to work with other media in ways obvious to those skilled in the art.

The longitudinal diameter of hole 36 (from leading edge 36a to trailing edge 36b) produced by the incidence of a write pulsed laser beam of a duration of 60 nanoseconds, with this media, in the preferred embodiment is substantially 1 micron, which is the same longitudinal diameter as laser beam 20 from leading edge 21 to trailing edge 22.

Note that it is not fully clear how the process of ablation of the information bearing tellurium or rhodium layer 32 occurs, but empiricly it is clear that a direct read after write does not return the same amount of modulation that a later read would over the same hole (that is, where both the read and the direct read after write laser power levels are the same low level). It is also clear that by adopting the read pedestal taught by this invention and continuing it after a write pulse, a more perceptible modulation in verification signal is produced, rather than the attenuated verification signal which would occur without using such a pedestal directly after the write pulse. This read pedestal power level concept may readily be applied to other media by varying the values for pulse duration and intensity as well as by varying the ratio of the three intensity levels.

The use of a read pedestal power level as described herein results in more accurate detection or confirmation of written information on the same pass as the write pass, and does not require more than one radiating beam of radiation.

Figure 3:
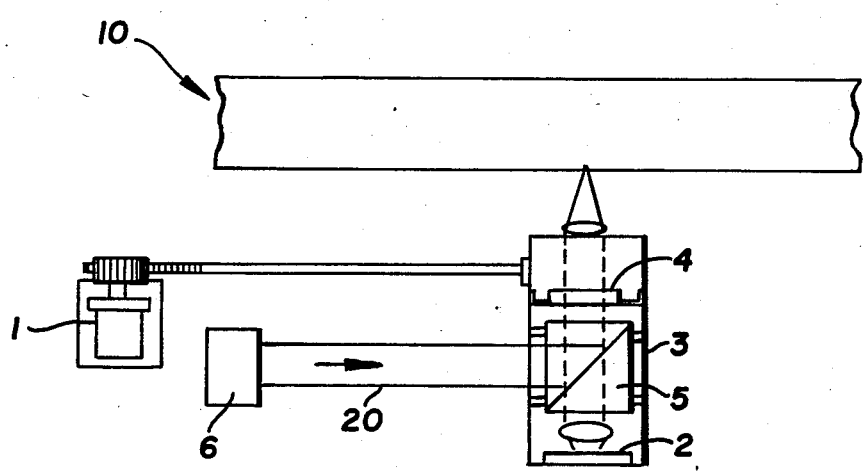
FIG. 3 is a generalized schematic illustration of an information storage device in which this invention may be used.

FIG. 3 is provided to illustrate a typical system which could employ the invention. A laser 2 which is controlled by the invention's circuitry 1, casts a beam 20 through optical path 3 to media 10. Media 10 reflects beam 20 through quarterwave plate 4 in optical path 3 and by beam splitter/mirror 5 onto detector 6 which yields an electrical signal for focusing, tracking, reading and feedback information.

To facilitate the description of this invention a circuit diagram of a preferred embodiment is described.

Figure 2:
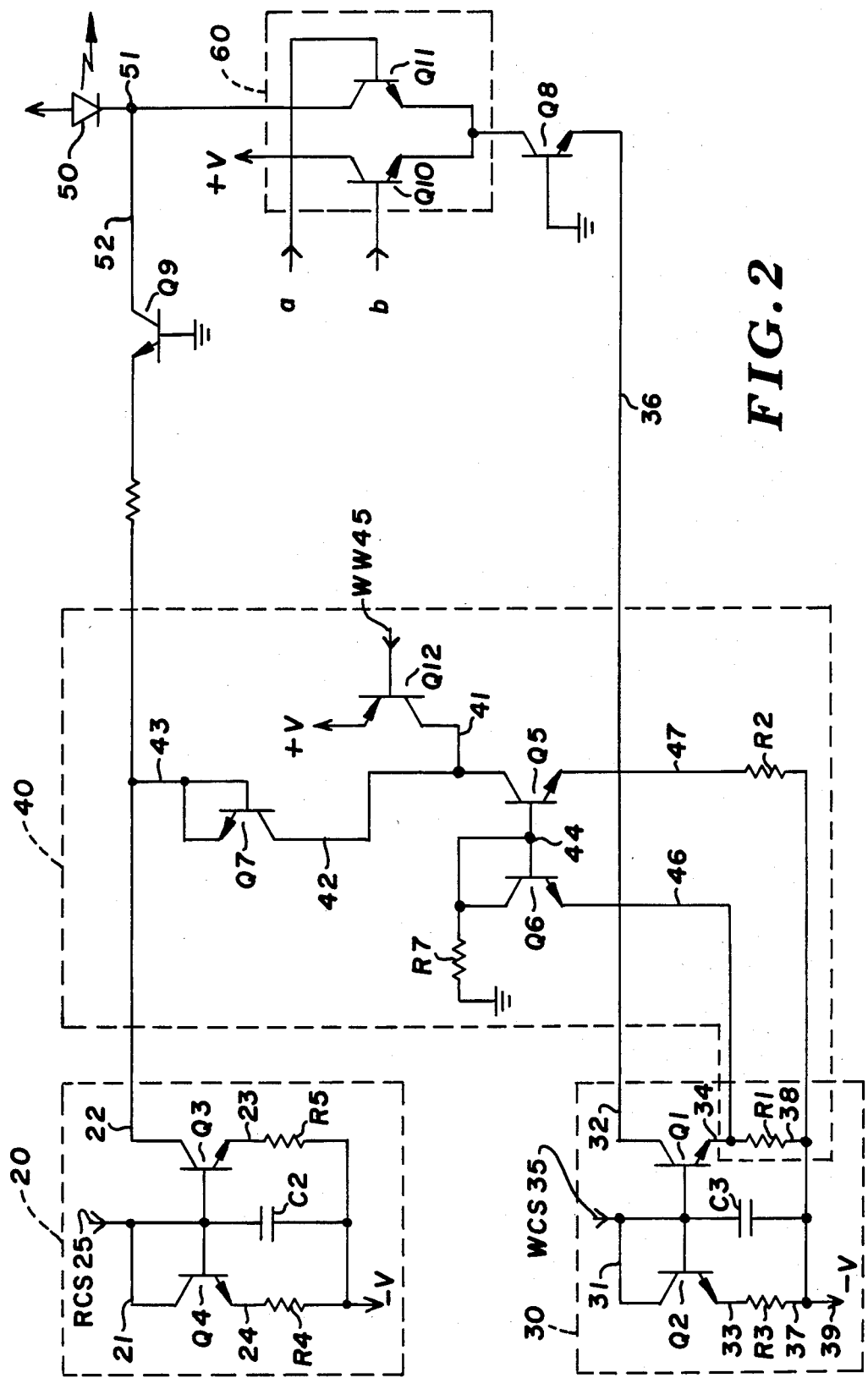
FIG. 2 is circuit diagram illustrating one practical implementation of the invention.

Referring now to FIG. 2 in which a circuit diagram (generally referred to with the numeral 11) depicting the configuration employed by the preferred embodiment is shown, and comprises mainly: write current source line (WCS) 35 and read current source line (RCS) 25 with associated current level maintenance circuits (write current source circuit 30 and read current source circuit 20 respectively); write pedestal circuit 40; write pulse control circuit 60; and laser diode 50. Basically, write window line (WW) 45 in pedestal circuit 40 turns the pedestal circuit 40 "off" by supplying current through line 41 during read-only operations, thereby allowing read current circuit 20 to maintain the voltage and current at conductor junction 51. During a write window, a "hi" signal on line 45 disables current flow through line 41, causing a demand for current through line 42 thus increasing current flow from laser diode 50 through junction 51 into line 52, thus turning "on" the pedestal circuit 40. During an actual write pulse, this current flow from laser diode 50 is further increased by switching inputs "a" and "b" to circuit 60, causing current to flow through transistor Q11 and not through transistor Q10 as would otherwise be the case, thus providing an additional demand for current from laser diode 50, directly from write current circuit 30 (via line 36 and junction 51).

A fuller explanation of the operation of circuit 11 begins with the assumption that the read current source line (RCS) 25 applies a constant level of current drain although in practice the read current source may be varied in response to feedback from the laser's performance so as to keep the output constant despite temperature or other idiosyncratic variations in a particular unit. This feedback would be responsive to the amount of light produced by the laser diode as measured from the point of its application to the record media and the feedback loop would maintain that intensity level constant by increasing or decreasing the current of line (RCS) 25. Use of a feedback loop to control laser output is well known in the art and is the subject of U.S. Pat. No. 4,122,409, for example and there may be many and various implementations of feedback loop means for the purpose of maintaining a constant laser output level known or obvious to those in the art. Therefore, no particular feedback loop is described.

Read current source circuit 20 is thus a current sink or drain which can be adjusted to draw more current when laser diode 50 is not producing the appropriate light intensity for an adequate read beam level, or less when the level produced is too high.

Read current circuit 20, employing transistors Q3, and Q4 resistors R4 and R5 and capacitor C2 connected as shown, is known in the art as a current mirror circuit, because the current flowing though one side is always proportional to that flowing through the other side. That is, the voltage at point 23 and point 24 are equivalent and the amount of current flowing through point 21 and 22 are proportional. Adjustment of the values of Resistors R4 and R5 will yield different. proportions of currents. For example, if R4 is 100 ohms, the current on line 24 is 10 milliamps and R5 is 10 ohms, current at line 23 will be 100 milliamps. If the value of R5 were then changed to 11 ohms current on line 23 would then be 90.9 milliamps.

The function of the current mirror circuits may be emulated in any number of ways. For example, the substitution of a reliable potentiometer, which is adjustable responsive to feedback determined by laser radiation level would be fine so long as laser output may be maintained at a constant level.

Read current source feedback circuitry is not described herein, not being necessary to the understanding of the invention. However, its use is of benefit because output characteristics of the laser may vary over its life, or operating temperature range.

Thus, during a read-only operation, the only current drain associated with conductor junction 51 is line 52 from circuit 20, and transistors $Q_7$ and $Q_{11}$ are open circuits. Current flows to write current source circuit 30 through line 36 from the positive voltage tied to the collector of transistor Q10 in write control circuit 60, because of a "hi" at line "b" to the base of transistor Q10 and a "lo" at line "a" to the base of Q11. Also, line 43 in write pedestal circuitry 40 does not provide a current drain because all the current required by line 47 is supplied through line 41 not line 42 when line WW 45 is low.

The current level of write current source WCS 35 should be subject to the same type of feedback as RCS 25. This obviates any need to adjust the current level flowing through write pedestal circuitry 40 because its current drain at line 43, is proportional to the current at line 32. Write current circuit 30 is constructed as a current mirror in the preferred embodiment, similarly to read current circuit 20; with one of the transistor pair, $Q_2$, having its collector tied to the current input (here line WCS 35, said input also tied to the bases of both transistors ($Q_1$ and $Q_2$) and via a capacitor ($C_3$) to a current drain (line 39). Here also the emmitters of both transistors ($Q_1$ and $Q_2$) are linked to the current drain line through a resistor each (R3 to $Q_2$; $R_1$, for $Q_1$). Write current circuit 30 also provides its current drain to laser diode 50 from the collector of one of its transistors, here $Q_1$. This current drain, however, must be selected by the control circuit 60 to cause a write power level pulse to issue from laser diode 50.

The write pedestal circuit 40 uses a portion of the power drain from the write current circuit 30 to provide a pedestal level, or stepped up amount of current drain of the laser diode 50.

In the preferred embodiment when it is determined that a write operation is to be performed in an approaching sector, the write window line (WW) 45 is enabled for the expected duration of that sector or for a "write window," that is, for the period of time during which the radiation beam will be traveling over a track length determined to be that sector. In the preferred embodiment, a determination that a sector will be written in will cause line WW 45 to be "hi" for the given amount of time determined to be a sector length passing time, for example, 4 milliseconds. The actual time during which the laser is at full write power is determined by the amount of time that the write pulse inputs "a" and "b" to control circuit 60 are switched, usually about 60 nanoseconds. The "hi" impulse on line WW 45 to the base of transistor Q12 (a PNP transistor, all other transistors in the preferred embodiment are NPN type) stops the emitter of transistor Q12 from conducting and prevents current flow across line 41. Transistor Q5, therefore, must draw current from line 42 across the emitter-tied-to-base transistor Q7 (acting as a signal diode) from line 43. This additional current drain must be supplied by line 52, thus increasing the current flow across laser diode 50 and therefore, increasing the light output to the read pedestal level. At the end of a sector during which a write operation is to be performed, WW 45 goes to low, thus disabling the power pedestal circuit 40 and again making current flow from laser diode 50 depend solely on read current source circuit 20.

To implement an actual write pulse, higher than the pedestal level, input "a" of circuit 60 switches to 37 hi" and input "b" of circuit 60 switches to "lo" causing current to be drawn through transistor Q11 to supply the requirements of line 36.

To complete the understanding of this circuit 11, the demand for current of lines 47 and 46 must be explained. This can best be done by example, in which the negative voltage indicated at current drain line 39 is minus 5 volts, and the voltage drop across resistors R1 and R3 is one volt, requiring for instance, an assumed current strength of 10 milliamps at point 33 with a resistor value for R3 of 100 ohms and a resistor value for R1 of 10 ohms to result in a current at point 34 of 100 milliamps (a gain of 10). Since the voltage drop across resistor R1 is one volt, voltage potential on line 46 would be minus 4 volts in this example. The voltage on line 44, there being approximately one diode drop across transistor Q6 (connected as shown), would be about minus 3.3 volts. Therefore, the voltage on line 47 would also have to be a negative 4 volts. If the value of resistor R2 is 40 times the value of resistor R1, i.e. 400 ohms, (and the voltage drop across resistor R2 is one volt) then the current on line 47 would be 4 milliamps. Therefore, 4 milliamps is drawn down conductor line 42 across transistor Q7 operating as sort of a signal diode. (Line 41 is open because the line WW 45 is "hi" for a write window.) This current on line 42 is drawn across line 43 and line 52 through conductor junction 51 from laser diode 50 thereby boosting the light output of laser diode 50 to the pedestal level approximately 30 to 40 percent above the nominal (read) level. Therefore, in short, the write current source circuit 30 controls the current drain through the write pedestal circuitry 40 to increase the current drain on laser diode 50 to the required pedestal level as a supplemental drain to that of read current source circuit 20 during a write window.

Note that the actual power level of the laser diode required for reading, pedestal level, or writing will vary significantly from media type to media type and the values set forth herein may be easily adapted to various media by those skilled in the art.

Transistors Q8 and Q9 are shown tied to a base, but the "base" (or ground) must merely be a more negative voltage than the anode of the laser diode to operate. These transistors Q9 and Q8 are included in the conducting lines 36 and 52 simply because lines 36 and 52 may be long cables, and this is a common way to remove parasitic capacitance noise from long cables found to be effective with this invention.

What is claimed is:

1. In an information storage device which employs radiant energy from a radiant energy source for reading and writing detectable modulations in record media for use with said storage device, wherein the point of application of said radiant energy upon said media and said media are moveable relative to one another, apparatus used during the write operation comprising:

a radiant energy source controlling apparatus for varying the intensity of radiant energy at said point of application in said record media among at least a low tensity first level sufficient for reading, a second level of higher intensity than said first level sufficient for writing, and an intermediate level of an intensity different from said first level and insufficient for writing during the normal operations of said information storage device but of a high intensity than that required for reading;

first means for causing said radiant energy source to emit radiant energy at said second level during a period of writing the detectable modulations in the record media;

second means for causing said radiant energy source to emit radiant energy at said first level during a period of reading the detectable modulations in the record media; and third means for causing said radiant energy source to emit radiant energy at said intermediate level during a period when not writing of the detectable modulations is being done.

2. The radiant energy controlling apparatus as set forth in claim 1 wherein said first, second and intermediate levels are adjustable in intensity to meet the read, write and intermediate radiation intensity level requirements of various particular record media.

3. The radiant energy controlling apparatus as set forth in claim 1, wherein said first level is approximately 0.7 milliwatts, said second level is approximately 16.0 milliwatts and said intermediate level is approximately 1.0 milliwatt.

4. A method for controlling a radiant energy source in an information storage device which employs radiant energy from a radiant energy source for reading and writing detectable modulations in record media for use with said storage device wherein said record media includes segmented tracks comprising sectors, and wherein the method comprises the following steps:

deciding whether a sector is to be written in or read from;

varying the intensity of radiant energy at the point of application of radiant energy upon said record media between a first intensity and a second intensity when said sector is to be written in, said first intensity being sufficient for writing and said second intensity being insufficient for writing; and causing said radiant energy source to emit radiant energy at a third intensity when said sector is to be read from, said third intensity being different from said second intensity, said third intensity being sufficient for reading and insufficient for writing.

5. A radiant energy controlling apparatus as set forth in claim 1, wherein said controlling apparatus is a circuit for maintaining and varying the current drain on said radiation source comprising: a write current source means for providing a first current drain, a read current source means for providing a second current drain (at least at all times said information storage device is reading or writing) to said radiation source at a lower level than said first current drain, said second current drain providing a magnitude of current drain suitable for eliciting a read power level from said radiation source, a control circuit means for selectively electrically connecting said first current drain to said radiant energy source, and a pedestal circuit means selectively providing an electrical connection between said radiation source and said write current source means, being so constructed to allow only a portion of the first current drain to draw current through it from said radiation source to said write current source means.

6. A radiant energy controlling apparatus as set forth in claim 2, wherein said controlling apparatus is a circuit for maintaining and varying the current drain on said radiation source comprising:

a write current source means for providing a first current drain, a read current source means for providing a second current drain (at least at all times said information storage device is reading or writing) to said radiation source at a lower level than said first current drain, said second current drain providing a magnitude of current drain suitable for eliciting a read power level from said radiation source, when used with said information storage device and the particular record media employed, a control circuit means for selectively electrically connecting said first current drain to said radiant energy source, and a pedestal circuit means selectively providing an electrical connection between said radiation source and said write current source means, being so constructed to allow only a portion of the first current drain to draw current through it from said radiation source to said write current source means.

7. A radiant energy controlling apparatus as set forth in claim 1, wherein said controlling apparatus is a circuit for maintaining and varying the current drain on said radiation source comprising:

a write current source circuit to provide a first level of current drain, a read current source circuit to provide a second level of current drain, in electrical connection said radiant energy source, a control circuit, in electrical connection between said write current source circuit and said radiation source, to selectively permit said write current source to provide said second level of current drain to said radiant energy source, a pedestal circuit, in electrical connection with said write current source circuit and with said radiant energy source to selectively permit a portion of the current drain from said write current source circuit to be provided to said radiant energy source so as to provide an intermediate level of current drain to said radiant energy source.

8. A radiant energy controlling apparatus as set forth in claim 7, wherein said intermediate level of current drain is the sum of the current drain levels provided by said read current source circuit and by said pedestal circuits.

9. A radiant energy controlling apparatus as set forth in claim 7, wherein said read current source circuit is a current mirror circuit.

10. A radiant energy controlling apparatus as set forth in claim 9 wherein said read current source circuit is in electrical connection to both an input current source and a current drain or ground and comprises a read current source input line in electrical connection to said current source, a read current drain line in electrical connection to said current drain or ground, and a pair of transistors with electrically connected bases in electrical connection with said read current source input line, and via a capacitor, with said read current drain line, the collector of the first of said pair in electrical connection with said read current source input line, the collector of the second of said pair in electrical connection with said radiant energy source, the emmitter of said first of said pair in electrical connection via a resistor to said read current drain line, and the emmitter of the second of said pair in electrical connection via a second resistor to said read current drain line.

11. A radiant energy controlling apparatus as set forth in claim 7 wherein said write current source circuit is a current mirror circuit.

12. A radiant energy controlling apparatus as set forth in claim 11 wherein said write current source circuit is electrically connected to both an input current source and a current drain or ground and comprises.

a write current source input line in electrical connection with said input current source, a write current drain line in electrical connection with said current drain or ground, and a write circuit pair of transistors with bases electrically connected to each other and in electrical connection with said write current source input line, and, via a capacitor with said write current drain line; the collector of the first of said write current pair in electrical connection with said write current source input line, the collector of the second of said write current pair in electrical connection with said control circuit, the emmitter of said first of said write current pair in electrical connection via a write circuit resistor to said write current drain line, and the emmitter of the second of said write current pair in electrical connection via a second write circuit resistor to said write current drain line.

13. A radiant energy controlling apparatus as set forth in claim 12 wherein said pedestal circuit comprises:

a junction line in electrical connection with said radiant energy source and said read current drain line, a first pedestal transistor, the emmitter of which is both in electrical connection to said junction line and in electrical connection with the base of said first pedestal transistor.

second and third pedestal transistors, the bases of which are in electrical connection with each other, in electrical connection with the collector of the second pedestal transistor, and also in electrical connection, via a first pedestal resistor, with a pedestal current sink; the emmitter of said second pedestal transistor in electrical connection between the emmitter of said second of said write circuit transistor pair and one side of said second write circuit resistor, wherein the emmitter of said third pedestal transistor is, via a pedestal circuit resistor in electrical connection to the opposite side of said second write circuit resistor, wherein the collector of said third pedestal transistor is in electrical connection, to the collector of said first pedestal transistor, and wherein a pedestal write window current source is selectably electrically connected to a point in electrical connection between the collectors of said third and first pedestal transistors.

14. A radiant energy controlling apparatus as set forth in claim 1, wherein said low intensity first level is maintained at a constant level by radiation sensitive feedback control loop circuitry.

15. A radiant energy controlling apparatus as set forth in claim 1, wherein said second level is maintained at a constant level by radiation sensitive feedback control loop circuitry.

16. A radiant energy controlling apparatus as set forth in claim 1, wherein said low intensity first level and said second level are maintained at constant levels by radiation sensitive feedback control loop circuitry.

17. A radiant energy controlling apparatus as set forth in claim 16 wherein said intermediate level is maintained at a constant level by the dependance of said intermediate level upon said first and second levels.

18. A method as claimed in claim 4 wherein:
said step of varying the intensity between said first level and said second level further comprises reading detactable modulations in said record media during the period that said radiant energy source is emiting radiant energy at said second level.

19. A method as claimed in claim 4 further comprising:
reading detectable modulations in said record media while said radiant energy source is emiting radiant energy at said second intensity to provide read information; and
using said read information for verifications of what has been written on said record media.

* * * * *

UNITED STATES PATENT AND TRADEMARK OFFICE
CERTIFICATE OF CORRECTION

PATENT NO. : 4,695,994

DATED : September 22, 1987

INVENTOR(S) : C. Steenbergen

It is certified that error appears in the above—identified patent and that said Letters Patent is hereby corrected as shown below:

In Column 4, line 46, please delete "." after the word different.

In Column 5, line 60, please delete "37 hi" and insert --hi-- therefor.

In Column 6, line 57, Claim 1, please delete "high" and insert --higher-- therefor.

In Column 7, line 1, Claim 1, please delete "not" and insert --no-- therefor.

In Column 8, line 17, Claim 7, after the word "connection" please insert --to--.

In Column 8, line 66, Claim 12, please delete "." after the word comprises.

In Column 10, line 27, Claim 18, please delete "detactable" and insert --detectable-- therefor.

UNITED STATES PATENT AND TRADEMARK OFFICE
CERTIFICATE OF CORRECTION

PATENT NO. : 4,695,994

DATED : September 22, 1987

INVENTOR(S) : C. Steenbergen

It is certified that error appears in the above-identified patent and that said Letters Patent is hereby corrected as shown below:

In Column 10, line 36, Claim 18, please delete "verifications" and insert --verification-- therefor.

Signed and Sealed this

Twenty-third Day of February, 1988

Attest:

DONALD J. QUIGG

Attesting Officer

Commissioner of Patents and Trademarks